United States Patent
Baxter et al.

(10) Patent No.: US 12,265,313 B2
(45) Date of Patent: Apr. 1, 2025

(54) SYSTEMS AND METHODS FOR VIDEO CAMERA SYSTEMS FOR SMART TV APPLICATIONS

(71) Applicant: Vizio, Inc., Irvine, CA (US)

(72) Inventors: Bill Baxter, Bellevue, WA (US); Glen Gihong Kim, Anaheim, CA (US); Zeev Neumeier, Berkeley, CA (US)

(73) Assignee: Vizio, Inc., Irvine, CA (US)

( * ) Notice: Subject to any disclaimer, the term of this patent is extended or adjusted under 35 U.S.C. 154(b) by 166 days.

(21) Appl. No.: 17/826,896

(22) Filed: May 27, 2022

(65) Prior Publication Data

US 2022/0382132 A1 Dec. 1, 2022

Related U.S. Application Data

(60) Provisional application No. 63/194,434, filed on May 28, 2021.

(51) Int. Cl.
*G03B 17/02* (2021.01)
*G03B 9/36* (2021.01)
(Continued)

(52) U.S. Cl.
CPC .............. *G03B 17/02* (2013.01); *G03B 9/36* (2013.01); *H04N 5/265* (2013.01); *H04N 23/51* (2023.01); *H04N 23/53* (2023.01); *H04N 23/54* (2023.01)

(58) Field of Classification Search
CPC ........ G03B 17/02; G03B 17/561; G03B 9/36; H04N 23/50; H04N 23/51; H04N 23/53;
(Continued)

(56) References Cited

U.S. PATENT DOCUMENTS 10,225,515 B1 * 3/2019 Sun ..................... G06F 1/3287
10,659,697 B2 * 5/2020 Yang ..................... H04N 23/51
(Continued)

FOREIGN PATENT DOCUMENTS

CN 206072676 U 5/2017
CN 103442188 B 5/2018
(Continued)

OTHER PUBLICATIONS

English translation of CN103442188B from Total Patent.
(Continued)

*Primary Examiner* — Amy R Hsu
(74) *Attorney, Agent, or Firm* — Hansen IP Law PLLC

(57) ABSTRACT

Video display systems comprising a video display and a camera assembly are shown and described. In one example, video cameras may be stowed in and deployed from a compartment proximate the upper surface of the display and configured to deploy in an arc-like motion and for rotation about a center of the video camera housing itself. In other examples, video cameras may be aligned with openings in the frame of the television screen and operatively connected to shutter plates that selectively admit light to or block light from the camera. In a further example, video cameras may be provided on motorized mounts that are attached to the frame to collect multiple images for video processing tasks to enhance the video image in a variety of ways.

15 Claims, 19 Drawing Sheets

(51) Int. Cl.
*H04N 5/265* (2006.01)
*H04N 23/51* (2023.01)
*H04N 23/53* (2023.01)
*H04N 23/54* (2023.01)

(58) Field of Classification Search
CPC ........ H04N 23/54; H04N 23/57; H04N 5/265; H04N 5/64
See application file for complete search history.

(56) References Cited

U.S. PATENT DOCUMENTS

| | | | | |
|---|---|---|---|---|
| 10,682,965 | B2* | 6/2020 | Oba | G01S 15/931 |
| 10,880,421 | B2* | 12/2020 | Fan | H04N 23/531 |
| 11,320,681 | B2* | 5/2022 | Son | B32B 17/06 |
| 11,671,692 | B2* | 6/2023 | Hou | H04N 23/56 348/374 |
| 2015/0289755 | A1* | 10/2015 | Voros | A61B 1/0125 600/109 |
| 2017/0272694 | A1* | 9/2017 | Chiang | G09G 3/2003 |
| 2018/0084166 | A1* | 3/2018 | Tachikawa | H04N 23/57 |

FOREIGN PATENT DOCUMENTS

| | | |
|---|---|---|
| CN | 209330240 U | 8/2019 |
| CN | 210246941 U | 4/2020 |
| CN | 210297895 U | 4/2020 |
| CN | 210958475 U | 7/2020 |
| CN | 210958476 U | 7/2020 |
| WO | 2019243367 A1 | 12/2019 |

OTHER PUBLICATIONS

English translation of CN206072676U from Total Patent.
English translation of CN209330240U from Total Patent.
English translation of CN210246941U from Total Patent.
English translation of CN210297895U from Total Patent.
English translation of CN210958475U from Total Patent.
English translation of CN210958476U from Total Patent.
"LG LED TV Owner's Manual", 55LA8600, 60LA8600. Apr. 2013.
"The best ways to video chat on your TV", Nov. 4, 2013, CNET Website https://www.cnet.com/how-to/the-best-ways-to-video-chat-on-your-tv/.

* cited by examiner

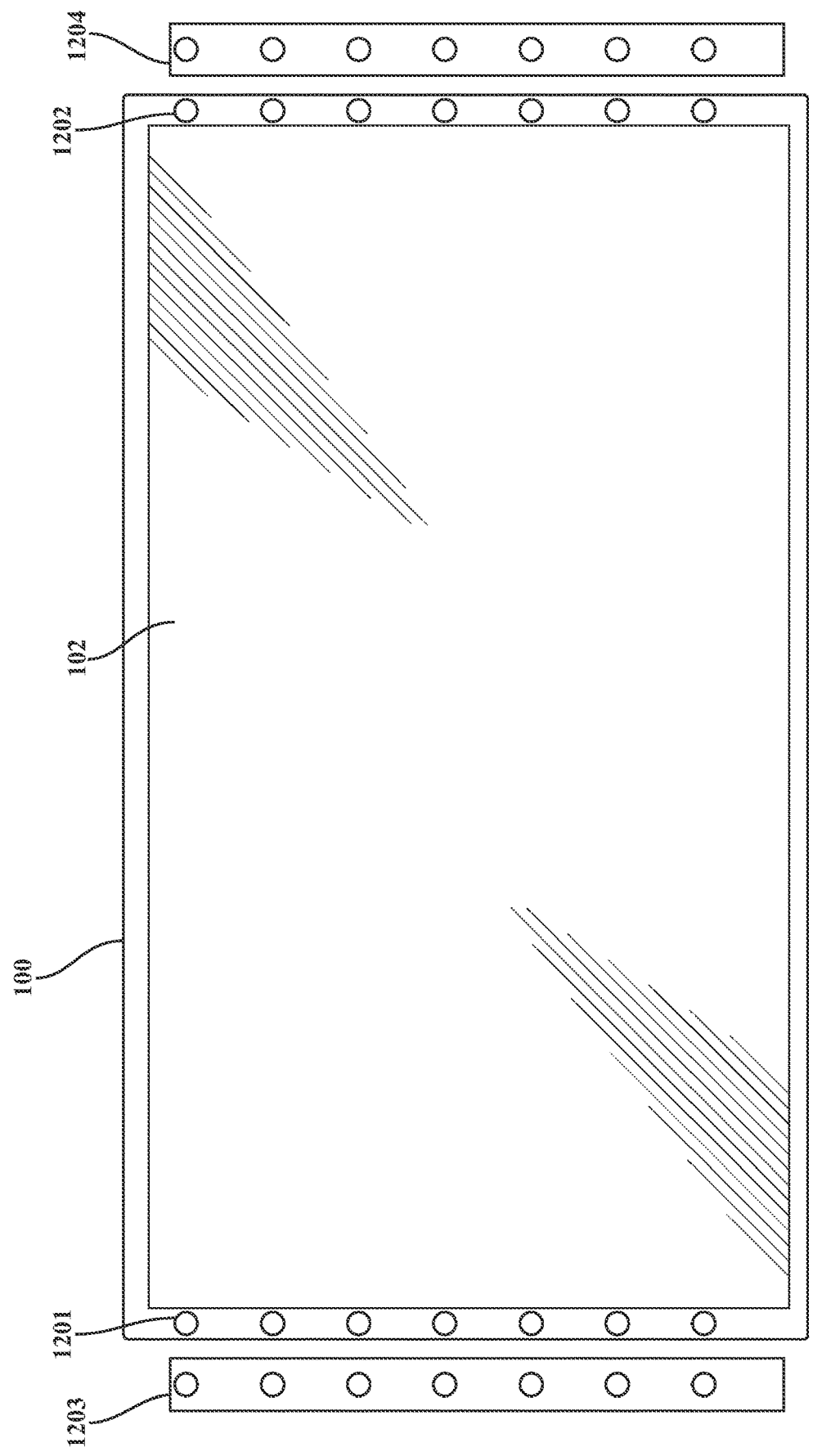

SYSTEMS AND METHODS FOR VIDEO CAMERA SYSTEMS FOR SMART TV APPLICATIONS

CROSS-REFERENCE TO RELATED APPLICATIONS

This application claims the benefit of U.S. Provisional Patent Application No. 63/194,434, filed May 28, 2021, the entirety of which is hereby incorporated by reference.

FIELD

This disclosure relates to mounting systems and video system configurations intended to integrate video cameras into flat panel televisions or similar visual display devices wherein the system may automatically stow the video cameras and/or visually confirm that recording is not occurring.

BACKGROUND

Flat panel displays such as televisions and computer monitors are essentially ubiquitous. Increasingly, such displays are supplemented with webcams or video conferencing cameras to enable face-to-face communications with other individuals over Internet connections, such as via the popular Zoom application, for social interactions with friends and family, conference calls, as well as for remote education applications.

Users are often wary of built-in cameras in laptops, as evidenced by the bits of opaque tape over the camera lens often seen at coffee shops or around the workplace. Even though built-in camera systems come with a tally light to indicate when the camera is on, there is distrust amongst users that the tally light is a reliable indicator of activity. Furthermore, there is widespread belief that such internet-connected cameras are potentially susceptible to being accessed by unauthorized individuals, generally known as "hackers," allowing a hacker to look into a room without activating the tally light with the obvious intrusion on the privacy of any person who happens to be within the visual range of the camera.

As a result, some webcams or video conferencing cameras are equipped—either by the OEM or an aftermarket supplier—with lens caps or mechanical shutters that must be manually removed or opened when the camera is in use. It is therefore desirable to provide a system that enables a camera system to be automatically deployed from a normally closed receptacle that is mounted on, or integrated with, a television or other video display device. When such a camera or its lens component system is no longer needed, it may be manually or automatically returned to an enclosed, opaque and dust resistant container while maintaining mechanical simplicity.

Another limitation of simple camera systems in use with smart TVs is the lens distance to the subjects. Current video cameras that are prevalent in mobile phones and laptops are designed for a close distance to the subject. A typical seating distance from a television display is on average ten feet. For a single-element consumer-grade camera, this can produce a lower-quality image due to limitations of the small image sensor, the lens in front of the sensor, as well as the available light in the room. These limitations, render subject too small in the video scene, and if the camera utilizes digital zooming, too noisy due to the typical low lighting of a family or TV room. If an optical telephoto lens is employed, then wide angle views of, say, an entire family sitting on a sofa would be compromised. In some examples, it is, therefore, desirable to utilize a multiplicity of cameras deployed in arrays of camera elements to improve on the single camera limitations.

SUMMARY

In accordance with a first aspect of the present disclosure, a video system is provided which comprises a video display having a front surface and a rear surface spaced apart along a depth axis, and an upper surface and a lower surface spaced apart along a height axis. A camera compartment is located proximate the upper surface of the video display, with the camera compartment having a recess. A dust cover selectively covers the recess. The dust cover comprises a cam follower surface. The video system also comprises a video camera in a camera housing, wherein the camera housing defines a cam surface and is selectively retractable into and deployable from the recess. A motor enclosed is provided in the recess and operatively connected to the camera housing, wherein the motor is selectively energizable to traverse the camera housing along an arc path such that the camera housing cam surface engages the dust cover cam follower surface to displace the dust cover and allow the camera housing to exit the camera compartment.

In accordance with a second aspect of the present disclosure, a video system is provided which comprises a video display having an upper surface and a lower surface defining a height axis, and a front surface and a rear surface defining a depth axis. A video camera is contained in a camera housing. A camera compartment is located proximate the upper surface of the video display. The camera compartment comprises a recess selectively covered by a dust cover. The camera housing has a stowed configuration in which the camera housing is located in the recess and a deployed configuration in which the camera housing is located outside the recess, and the camera housing has a camera housing center and is rotatable about the camera housing center to alter a viewing angle of the camera when the camera is in a deployed configuration.

In accordance with a third aspect of the present disclosure, a video display system is provided. The video display system comprises a video display comprising a frame surrounding a screen, a plurality of cameras, each camera being aligned with a corresponding opening in the frame, and a shutter plate having a plurality of openings, each opening corresponding to a camera in the plurality of cameras, wherein the shutter plate is selectively positionable to align each opening with a corresponding one of the cameras, thereby admitting light to the camera.

In accordance with a fourth aspect of the present disclosure, a video display system is provided which comprises a video display comprising a screen and a frame, the frame having a height along a height axis and a width along a width axis. A plurality of cameras is attached to the frame, each camera being movable along the height axis and rotatable toward and away from the screen.

BRIEF DESCRIPTION OF THE DRAWINGS

The present disclosure is illustrated by way of example and not limitation in the accompanying figures, in which like references indicate similar elements, and in which:

FIG. 2 is a close-up of camera and microphone array assembly 200 of the TV of

FIG. 1 with the video camera assembly 101 deployed;

FIG. 4A shows a front elevational view of the TV of FIG. 1 with the video camera assembly 101 deployed and in which the TV also includes a single tally light 401 to indicate whether the camera is on;

FIG. 4B shows a front elevational of the TV of FIG. 4A with two tally lights, one for video 401a to indicate whether the camera is on and one for audio 402a indicate whether a microphone is on;

FIG. 11A shows an alternative embodiment of the host TV of FIG. 1 with an array of cameras and aligned pin-hole camera lenses mounted to the frame of the television 100;

DETAILED DESCRIPTION

As audio-video communication systems for work-at-home or for various social-media applications have become more common, there is a need for a more versatile mounting and deployment system for integrating microphone and video camera systems into television display systems in a manner that is visually appealing and also protects both the device as well as the user's privacy.

Figure 1:
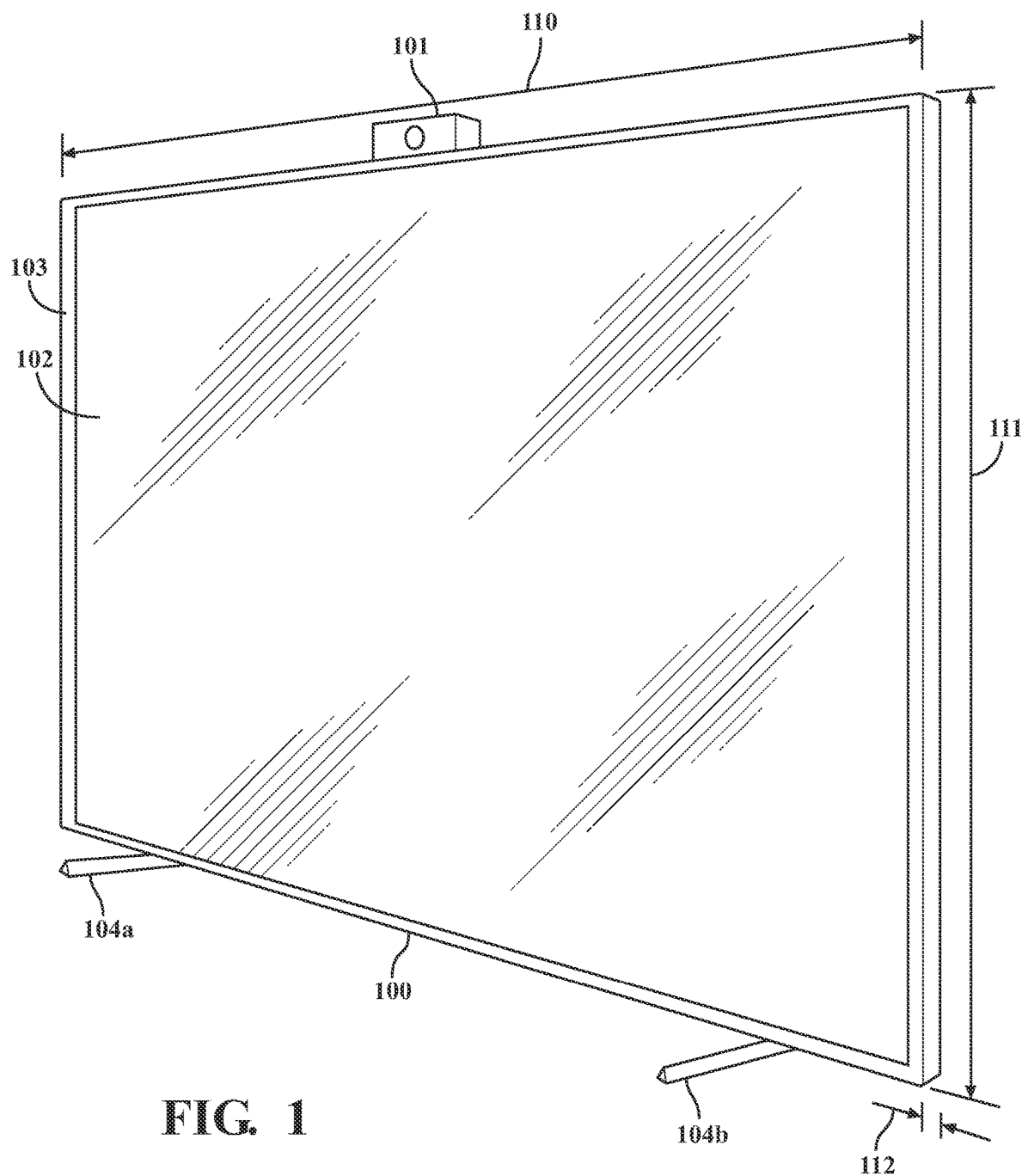
FIG. 1 shows a host TV 100 with an integrated video camera assembly 101 elevated over the upper edge of the television.
Figure 8:
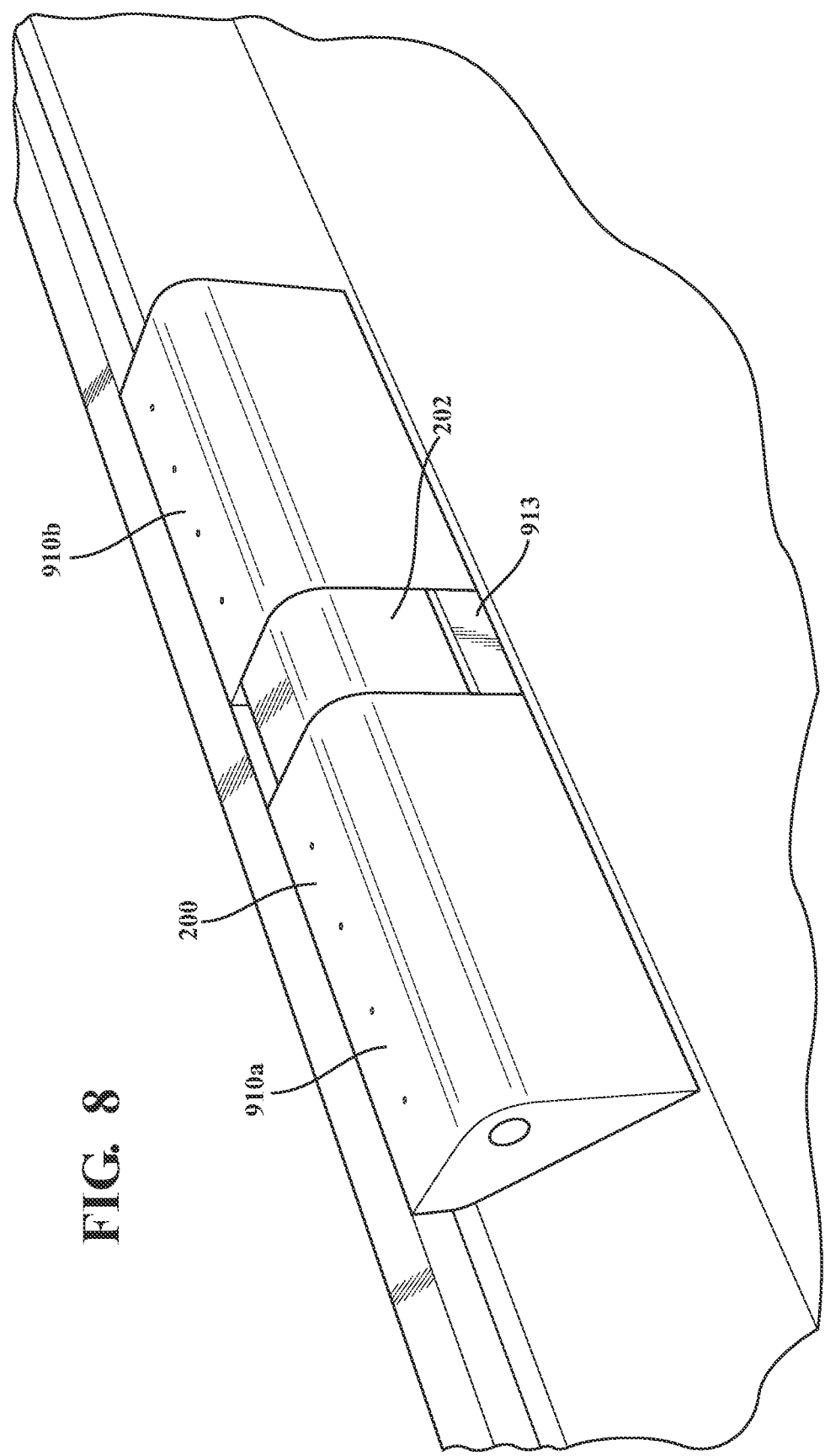
FIG. 8 a rear perspective view of the video camera assembly of FIG. 1 in a stowed configuration.
Figure 9:
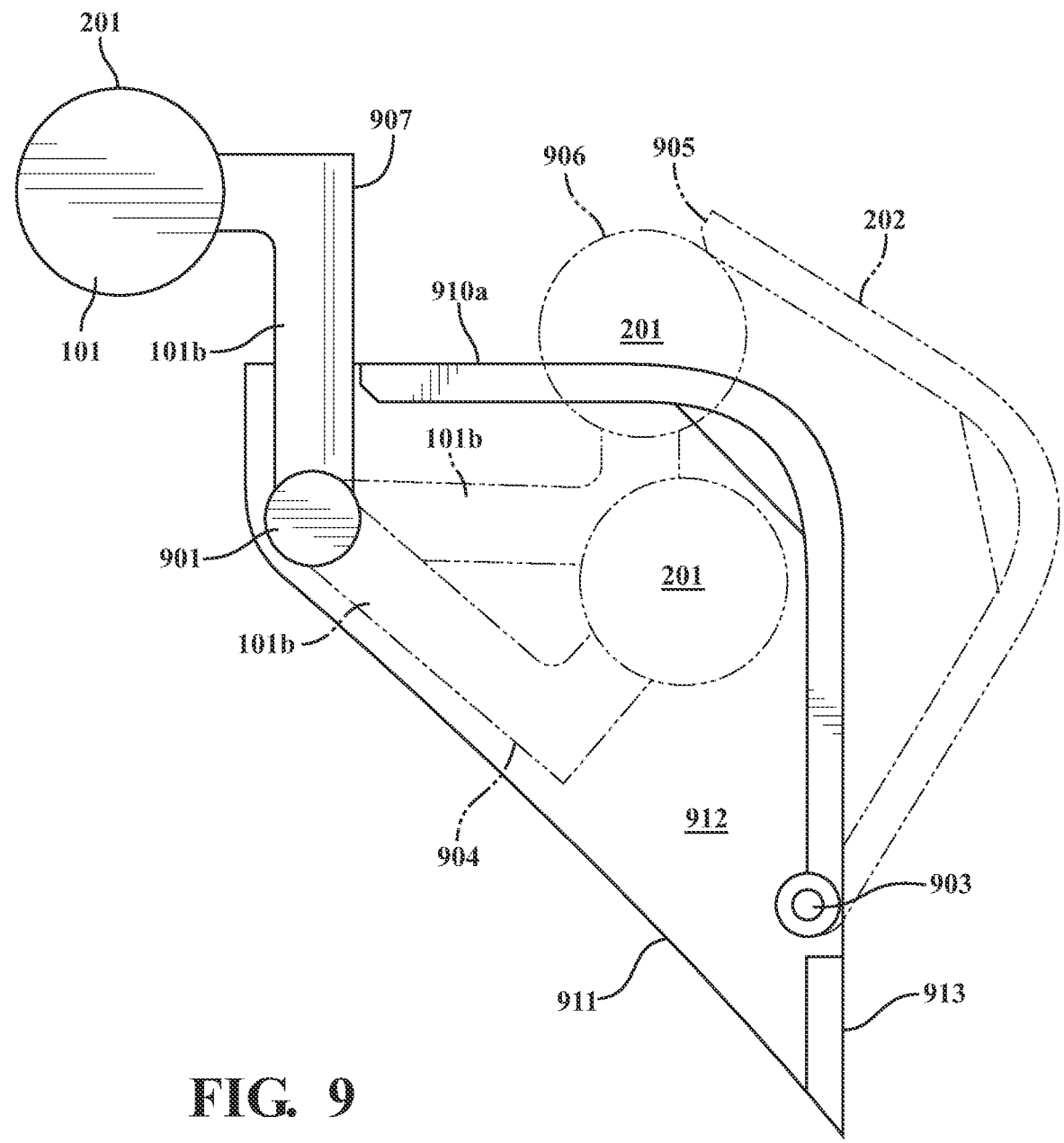
FIG. 9 is a side cross-sectional view of the video camera assembly of FIG. 1 shown in stowed, deployed, and partially deployed (stowed) configurations.

An exemplary smart TV system 100 is shown in FIG. 1 where its height along a height axis 111, width along a width axis 110, and depth along a depth axis 112 define the relative dimensions of the physical device. The display panel 102 is surrounded by display frame 103 and supported by display stand members 104a and 104b. A video camera assembly 101 is selectively stowable in and deployable from a compartment 912 defined by L-shaped compartment walls 910a, 910b, a surface 911 of the TV frame and dustcover 202 (FIGS. 8-9).

Figure 2:
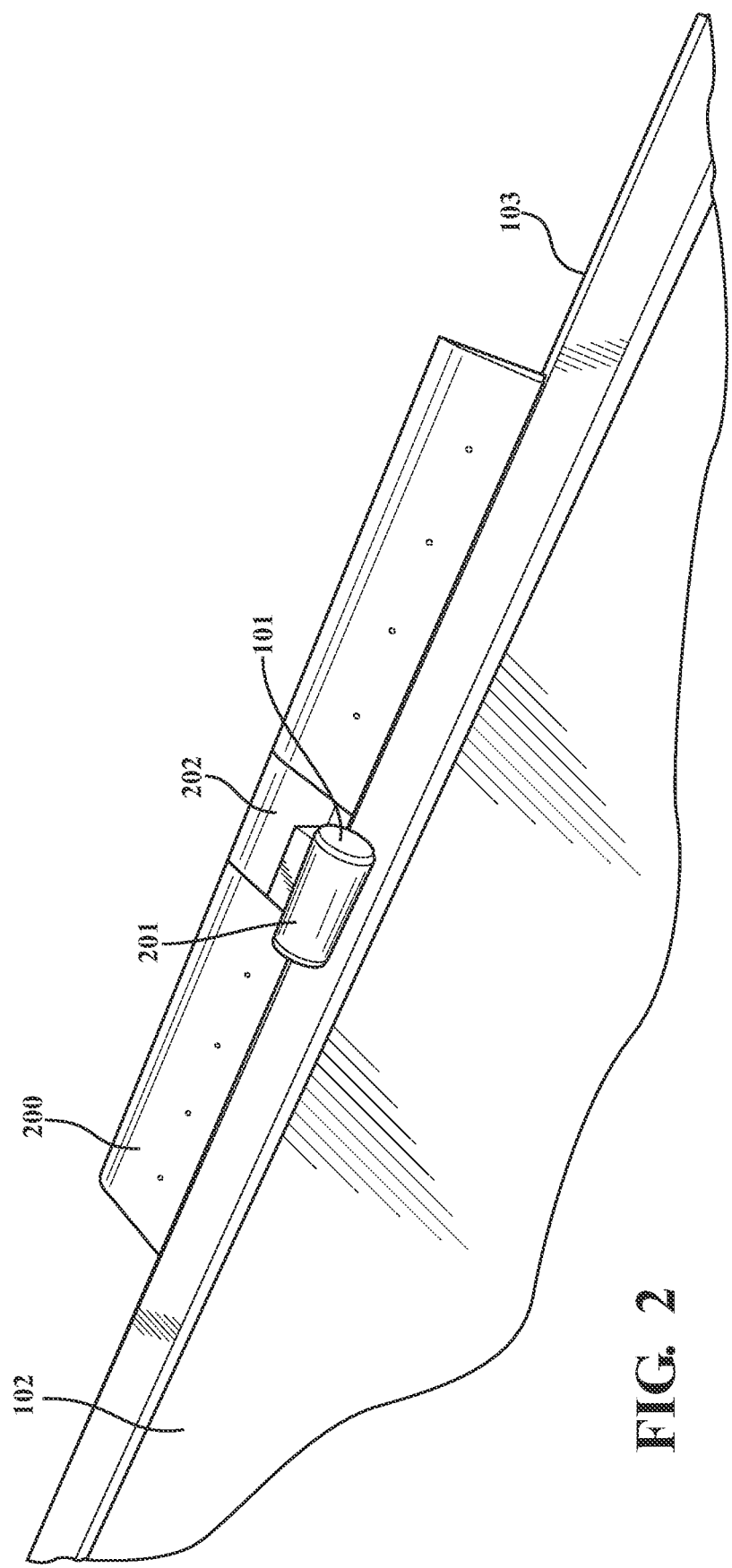
Figure 3:
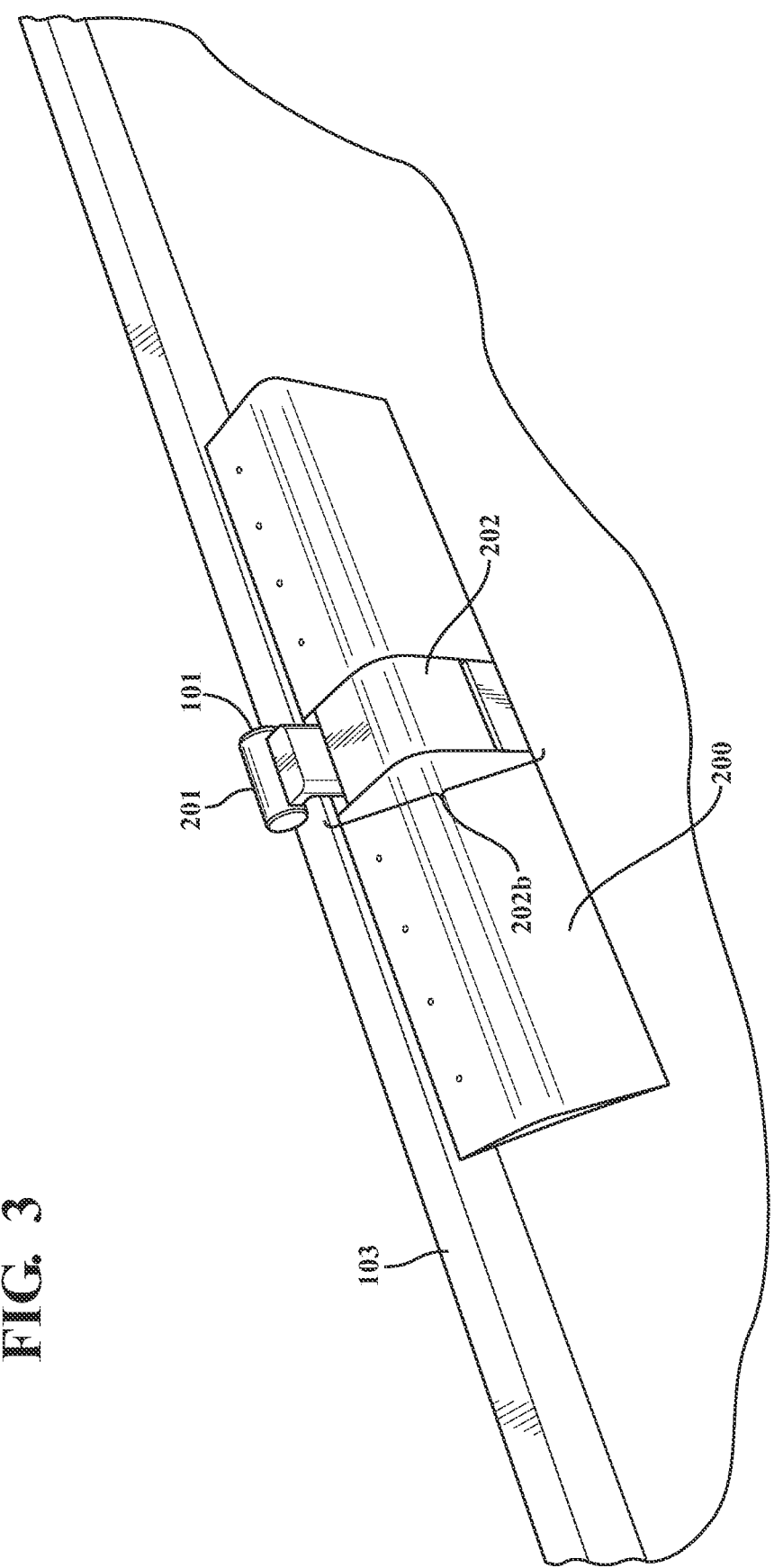
FIG. 3 depicts a view of the back of the host TV 100 with the camera and microphone array assembly 200, wherein the video camera assembly 101 is shown in a deployed configuration with a closed dust cover 202.

In FIG. 1 video camera assembly 101 is shown deployed on the top surface of the TV system frame 103. As shown in FIGS. 2 and 9, video camera assembly 101 comprises a cylindrical housing 201 enclosing a camera (not shown) and an 'L'-shaped camera arm 101b (FIG. 9) on which cylindrical housing 201 is mounted. In FIG. 2 the video camera assembly 101 is shown in a fully deployed position when looking from the front of the TV system 100 and down upon the top of the display frame 103. In the fully deployed position, dust cover 202 is closed behind the camera assembly 101, which is enclosed in the camera storage area 202b (FIG. 3). In FIG. 3, from a perspective behind the TV system 100, the video camera assembly 101 and microphone array housing 200 are illustrated.

In preferred examples, camera housing 201 is operatively connected to a motor that is operable to move the camera housing along a desired path. FIG. 9 shows the video camera assembly 101 in three positions: fully-stowed 904, partially deployed (or partially stowed) 906, and fully deployed 907. The fully-stowed 904 position of the housing 201 may also be referred to as "reset point" since the camera assembly is reset to its pre-deployment position. As best seen in FIG. 2, in the fully deployed position, the camera housing is spaced apart from the upper surface of display frame 103 in a direction along the height axis 111 and from the display 102 along the depth axis 112. The stowed, partially-deployed, and fully-deployed configurations represent three sequential "turning points" because a location on housing 201 where there is an opening for the camera will traverse a curved (arc) path, as discussed further below.

A motor drive unit 901 within compartment 912 provides propulsion to both move the camera assembly 101 into position during a deployment operation as well as to retract the camera assembly 101 during a stowing operation. In the case of deploying the camera assembly 101, the motor drive unit 901 moves the camera housing 201 in an arc-like path along a counterclockwise direction (when viewing from the right side of the assembly) from its stowed position 904 to its deployed position 907. More specifically, in the example of FIG. 9, the arc traversed by the camera housing 201 is a constant-radius arc. Camera arm 101b is connected at one end to camera housing 201 and at an opposite end to the shaft of motor 901. A dust cover 202 is attached to a base wall 913 (FIG. 9) by a mounting axle 903 and is spring-loaded by a torsion spring (not shown) so that dust cover 202 is pushed out of the way by the motion of the camera arm 101b. As the motor drive 901 continues the rotation of the camera arm 101b past partially-deployed position 906, the chamfered edge 905 of dust cover 202 begins to fall back into the closed position and when the camera assembly 101 is in the fully deployed position 907, the dust cover 202 closes as shown in FIG. 8. In this manner the chamfered edge 905 serves as a cam follower that follows the cam surface defined by the cylindrical housing 201. In preferred examples, when camera housing 201 is in the deployed configuration, the housing 201 can be rotated about its own cylindrical axis to alter the angle of view of the camera contained therein.

Upon retraction of the camera assembly 101, the force from the motor assembly 901, now rotating in a clockwise direction, causes the cylindrical camera housing 201 to engage chamfered edge 905 of the dust cover 202, causing cover 202 to be forced back against its spring action and tracking the contour of the camera assembly 'L' bracket 101b. At position 906, the dust cover 202 reaches the crest of the cylindrical housing 201 and begins to now close. When the camera assembly 101 is at rest in position 904, the dust cover 202 is once again fully closed by virtue of its spring action. Hence, the complete process of deploying and retracting the camera assembly 101 is accomplished using a single motor drive unit 901.

In a preferred embodiment of the present disclosure, an appropriate key press on a remote control or mobile app associated with television 100 or, in some embodiments a verbal command as received by a microphone array built into microphone array housing 200, is used to initiate motor drive unit 901. This action causes the camera assembly 101 to be moved from an initial, fully-stowed position 904 to a final fully-deployed position 907 just above the supporting television's upper edge 103 which is accomplished as described above.

To accomplish this, drive unit 901 rotates at a first angular velocity to drive the camera assembly 101 in an arc-like path along a first route, displacing the dust cover 202 and then stopping just above the upper edge of the supporting television 100. As illustrated in FIGS. 6-9, when the video camera assembly 101 is no longer required, a stowing operation is commenced by activating the drive unit 901 to rotate at a second angular velocity to drive the camera unit in a second (return) route opposite the first route. As illustrated in FIG. 9, the exterior contour of the camera arm 101b initially pushes the dust cover open, and subsequently the cylindrical camera housing 201 engages the dust cover's chamfered front edge 905 to continue opening dust cover 202. The dust cover 202 is then returned to its starting (closed) position by the torsion spring (not shown) integrated with the dust cover's mounting axle 903 as illustrated in FIG. 8.

Figure 4A:
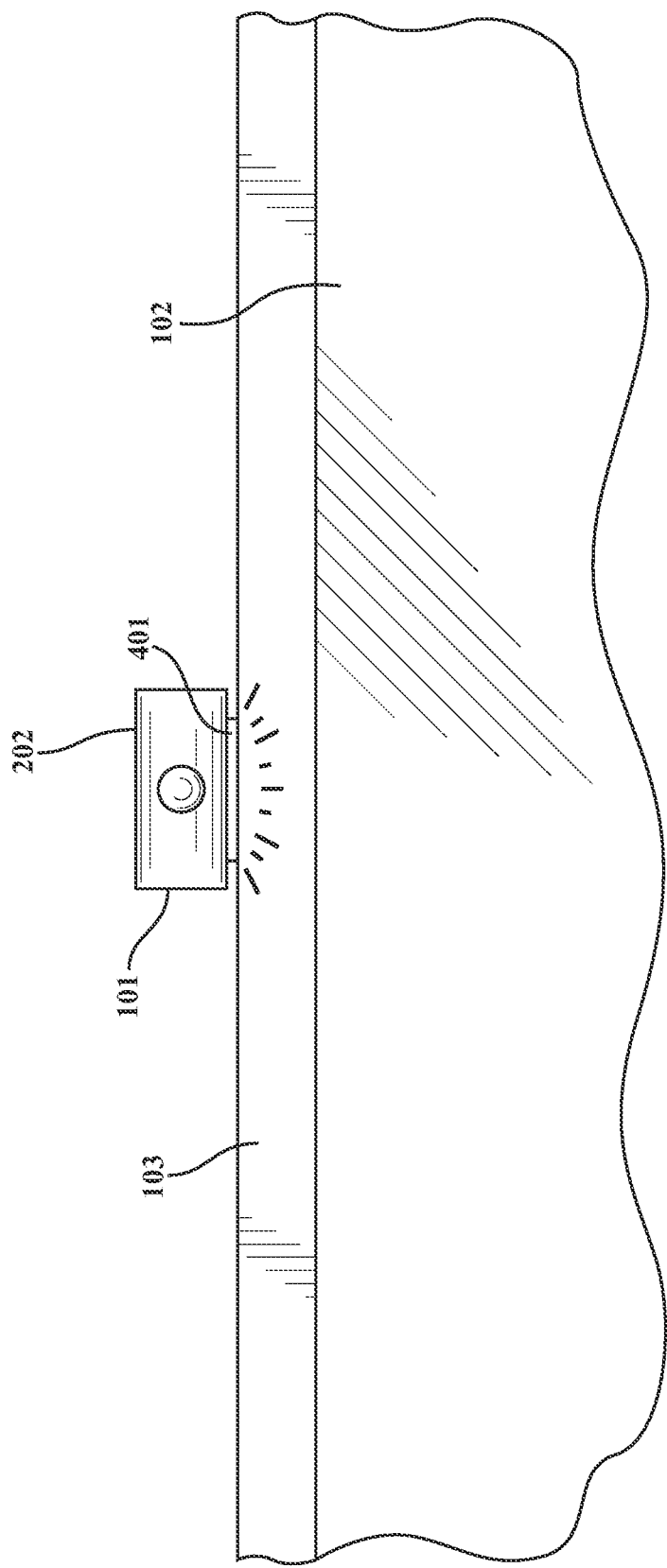
Figure 4B:
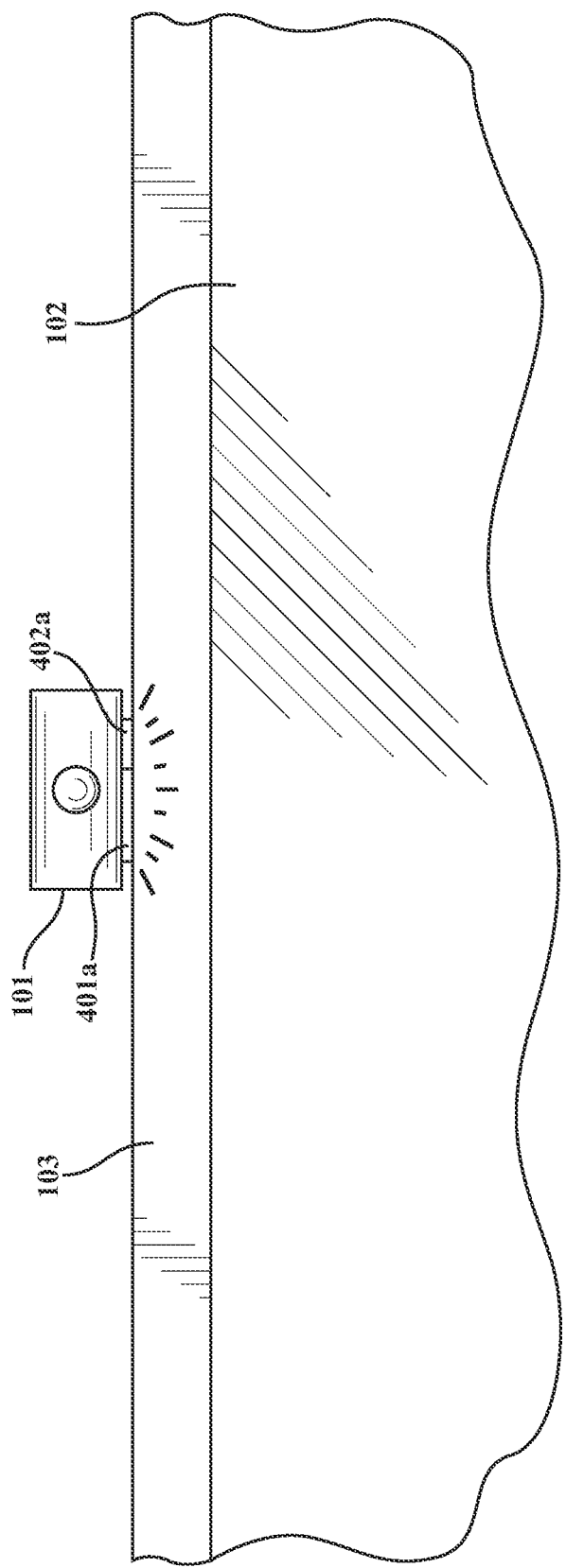

Additional privacy assurances are provided by a tally light system as illustrated in FIGS. 4A-4B. The one or more tally lights, which are tally lights 401 and 402 in the case of FIGS. 4A-4B, are incorporated beneath camera housing 201, with the lights 401, 402 being illuminated green when the camera is enabled and red when the camera is disabled, for example only. In another embodiment as illustrated in FIG. 4B, two tally lights are incorporated where tally light 401a may represent the video camera power state as ON when green and OFF when red. The tally light 402 may represent the microphone state as green when the microphones are listening (active) when red when the microphones are muted.

Figure 5:
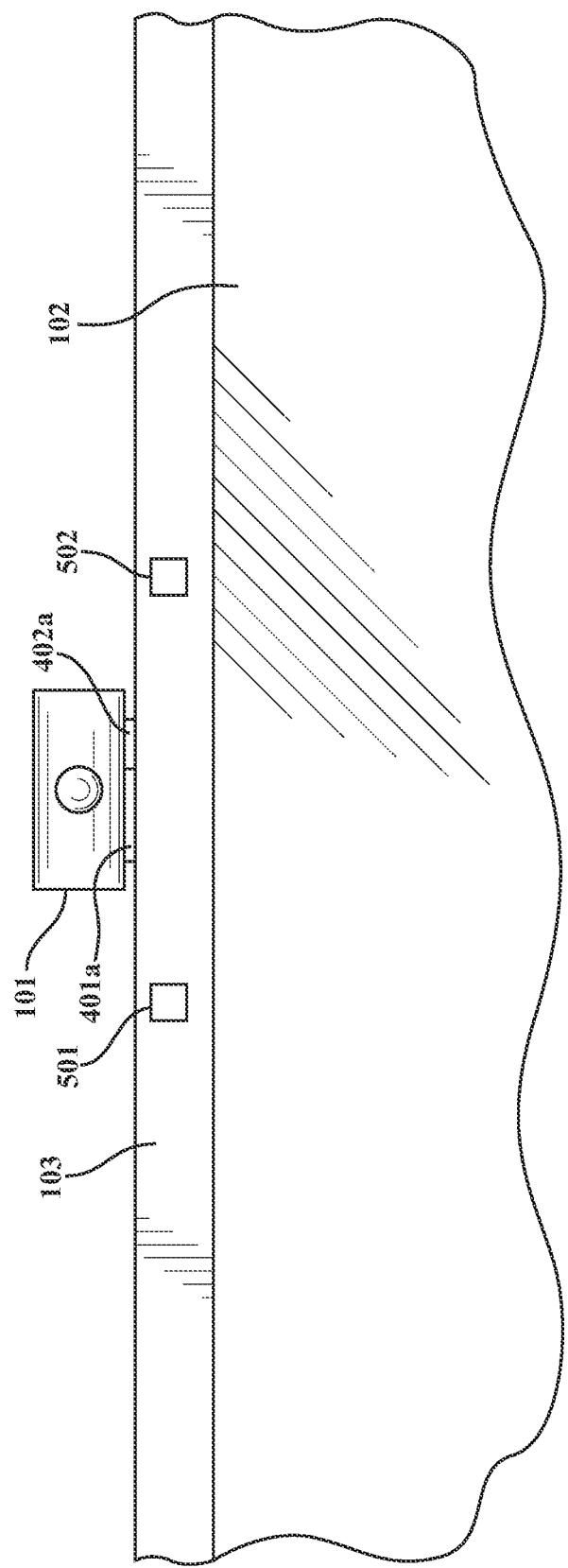
FIG. 5 shows an embodiment of the TV of FIG. 1 with two motion sensors to detect persons in the television viewing area.
Figure 6:
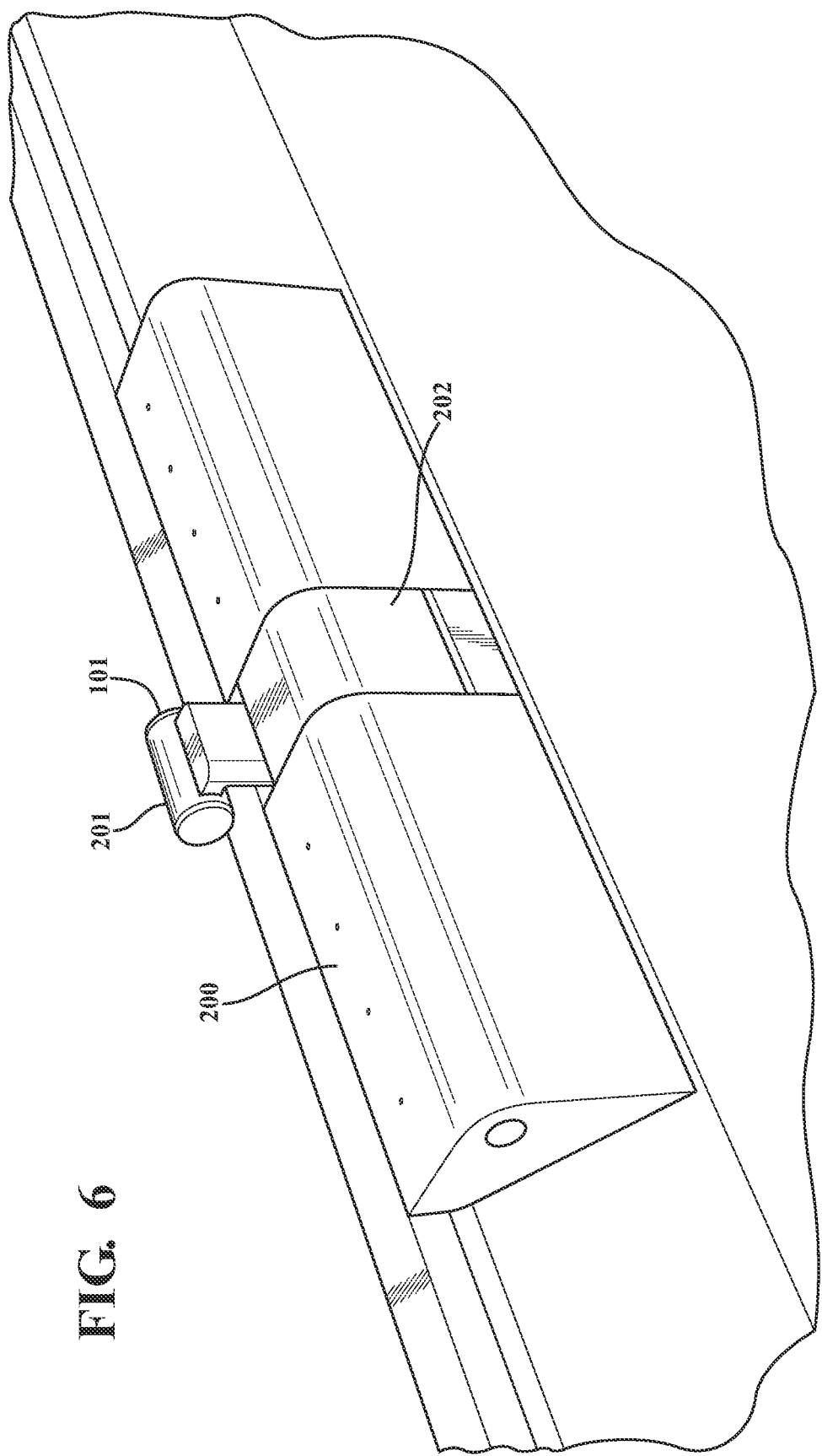
FIG. 6 illustrates a rear perspective view of the video camera assembly 101 of FIG. 1 in a deployed configuration with the video camera assembly elevated and the dustcover 202 closed.
Figure 7:
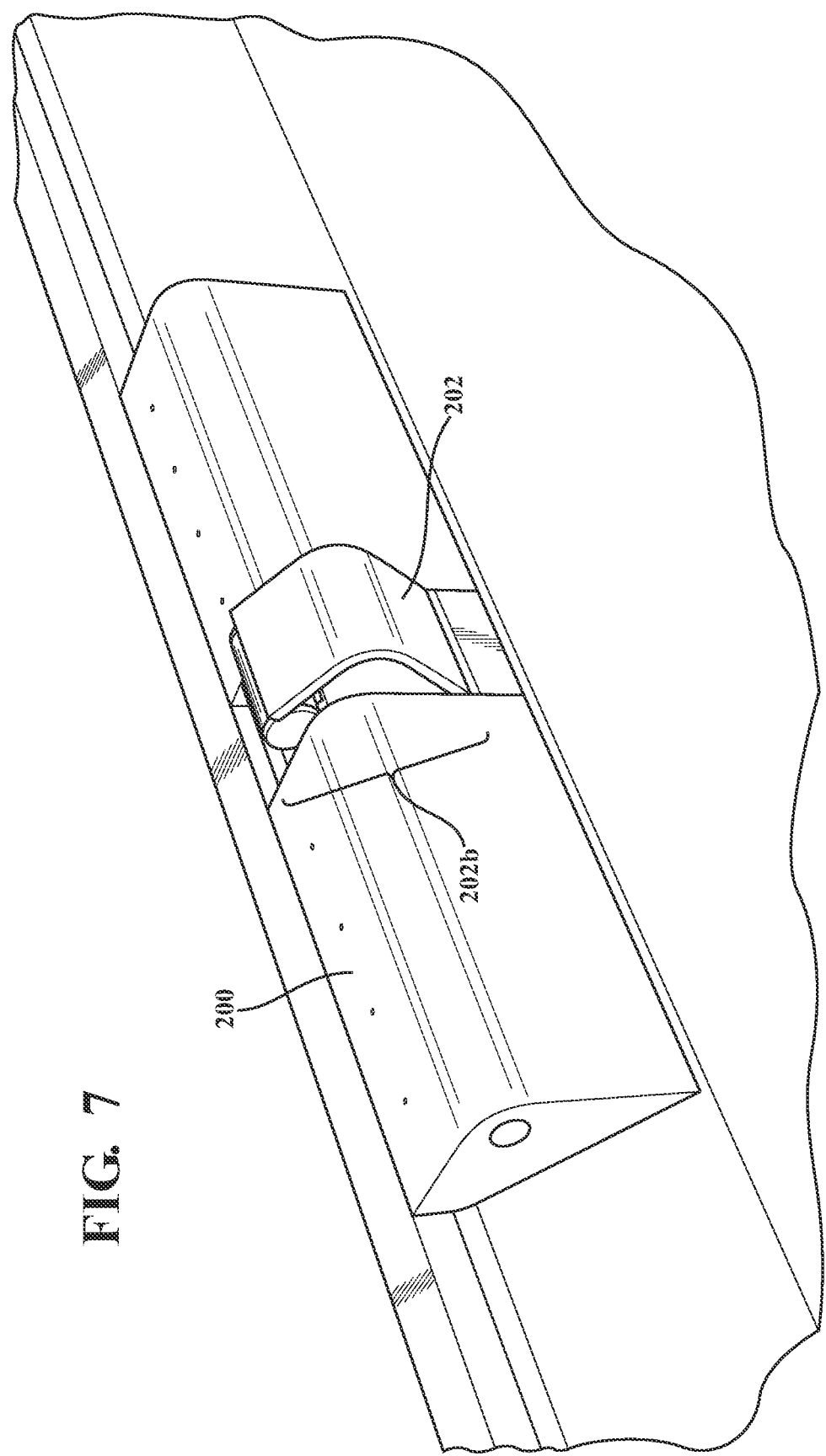
FIG. 7 is a rear perspective view of the video camera assembly of FIG. 1 during a stowing operation showing the dust cover being opened by the force of the retracting camera while it is in the process of being stowed.

For the purposes of one embodiment of the process of automating the deployment of the camera system, FIG. 5 shows motion sensors 501 and 502 which detect the presence of persons in the area in front of the television 100. The television user can configure the television settings to have the camera deploy when the user is present and for the camera to be stowed when no person is present. The means of setting preferences for television features are well known to the skilled person.

Figure 10:
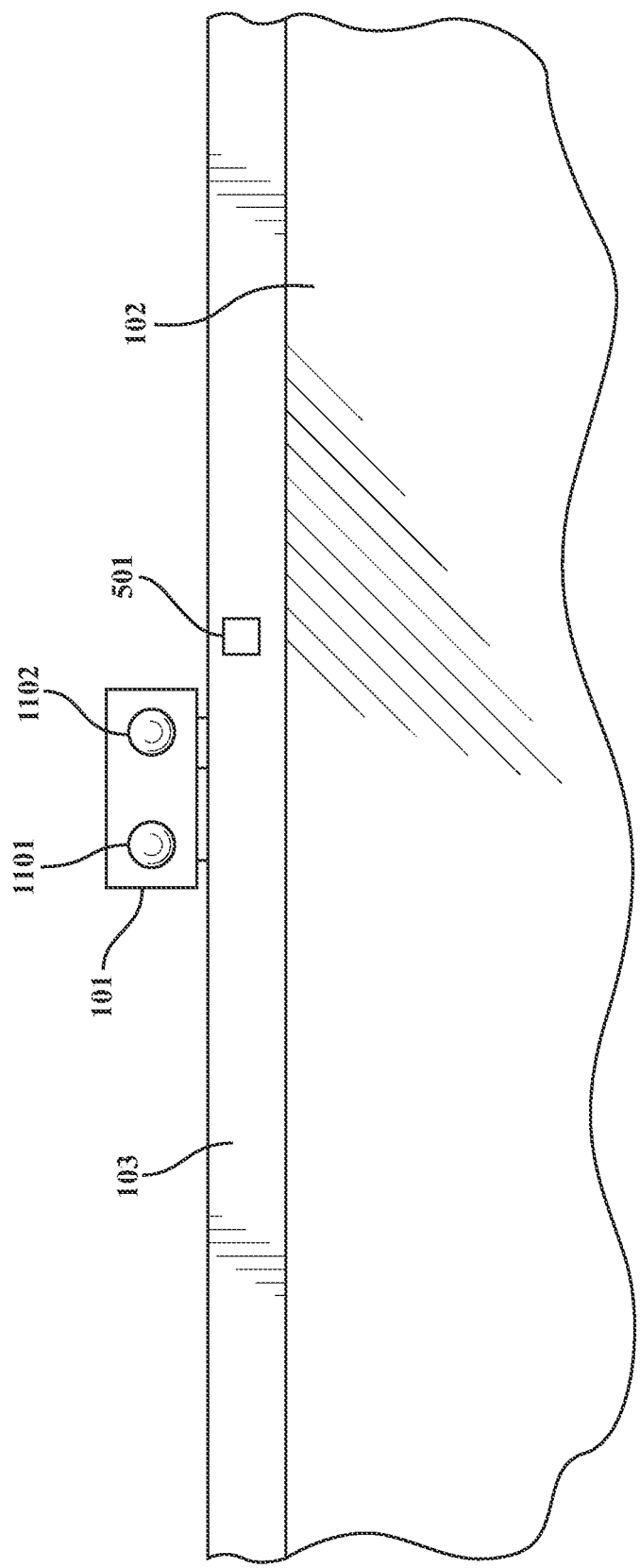
FIG. 10 shows a TV comprising stereo camera system with cameras 1101 and 1102 included in a single housing and shown in a deployed configuration.

An alternative embodiment is depicted in FIG. 10 where the single camera housed in cylindrical housing 201 is replaced by multiple cameras 1101 and 1102 to enable the system of the disclosure to capture, for example only and in no way to limit the usage, stereoscopic imagery which could be used by a process of the disclosure to measure distance of the viewer from the television and determine the amount of digital or optical zoom needed to show the person in full frame. Likewise, the distance measurement could be used to determine scene lighting required for an optimal video image and to alert the user to increase or decrease the lighting or to control the automatic increase or decrease the lighting if such a capacity is available to the television system.

Figure 11C:
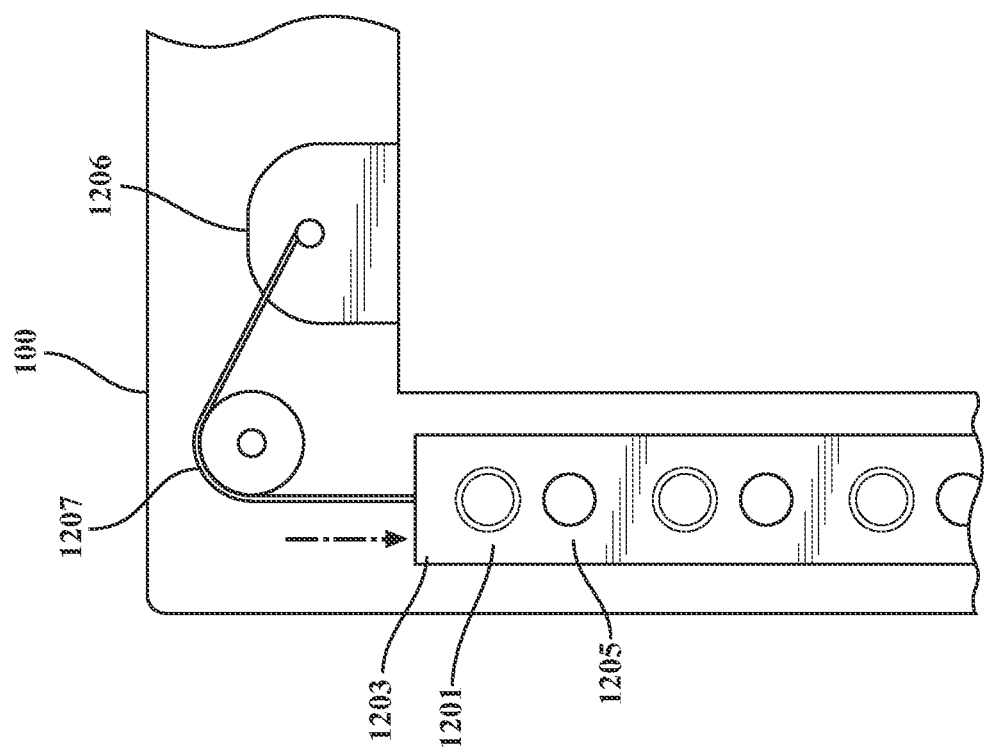
FIG. 11C shows a mechanical breakout of the alternative embodiment of FIG. 11A with shutter plate 1203 positioned to block light from striking the cameras.
Figure 11B:
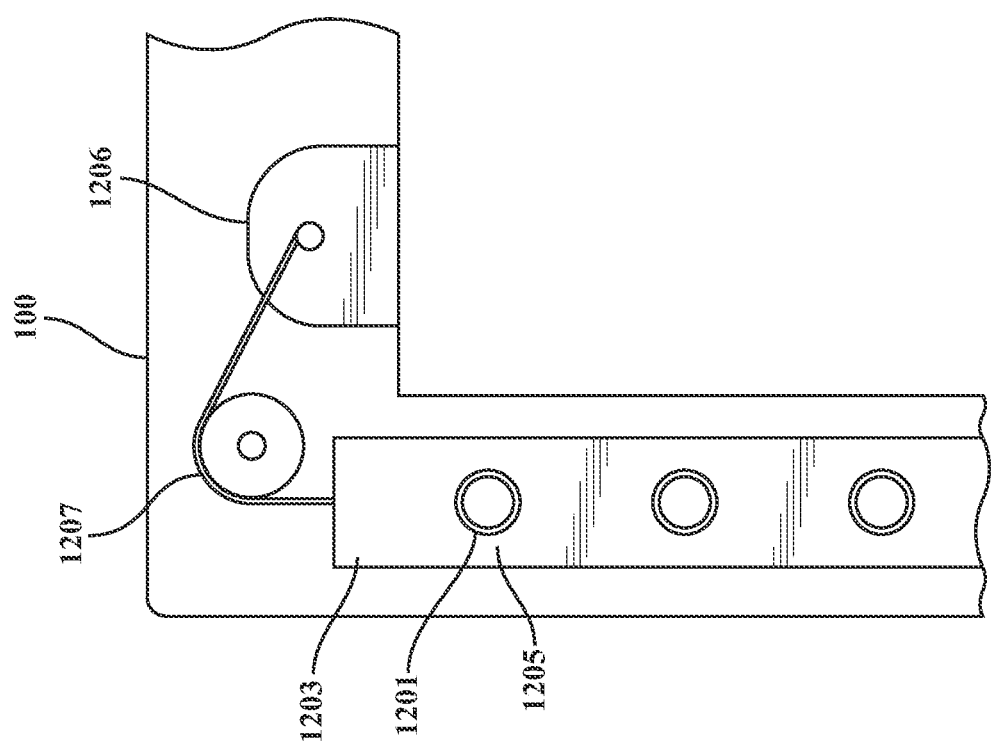
FIG. 11B shows a mechanical breakout of FIG. 11A with the holes of camera lens shutter plate 1203 aligned with the cameras 1201.

An alternative embodiment is depicted in FIGS. 11A-11B where arrays 1201, 1202 of small "pinhole" cameras are mounted in the frame 103 of the host television 100 on both the left and right sides, respectively. The video from the cameras in arrays 1201, 1202 can be processed by the computer processor of the television 100 for many useful purposes. In one example, multiple video pictures are combined to form a larger format and higher quality video picture of, for example only, perhaps a 4K (3840×2160 pixel) picture from the array of low-cost 720p (1280×720 pixel) camera sensors. The processor system 1400 of TV 100 shown in FIG. 13 would combine the independent video images from the camera arrays into a composite, larger format video picture utilizing video stitching techniques well known to the skilled person. Likewise, and again for example only, the arrays 1201, 1202 of cameras can be harnessed to create the effect of zooming in or out of a video scene. For example, utilizing the array microphone system of the disclosure, a camera processor 1401 can utilize the directional information obtained by the microphone array of the television to zoom in and focus on the speaker in front of the television 1 even if that person is in a group of others such as family members on a video call with other family or friends. The process of locating a speaker by means of a microphone array is well known to the skilled person. The process is known as "beam forming" and is carried out by performing a digital processing method that uses phase cancellation of the signals received from two or more microphones in steps to determine the loudest sound. This is an algorithm well known to the skilled person. A trigonometric process applied to the phase angles of the microphone elements of the array reveals the direction of the loudest audio signal.

Yet another use of a camera arrays 1201, 1202 of FIGS. 11A-11C might be to feed the composite video to the processor 1403 to utilize a signal processing algorithm to conduct a video image transform that adjusts the image of the person in front of the television to always appear to be looking at the camera when facing the TV within practical limitations of viewing angle.

In FIG. 11B, a mechanical breakout of the alternative embodiment of FIG. 11A is illustrated showing the holes of camera lens shutter plate 1203 aligned with each of the cameras of camera array 1201. The shutter bar is mounted inside the frame 103 of the TV 100 and travels in front of the camera lenses within the frame. The shutter bar has been lifted into place by motor 1206 via pulley 1207 (FIGS. 11B-11C) allowing light to pass through cut-out holes 1205 in the plate 1203 aligned with the distance between cameras of the array 1201 and to strike the individual cameras. Likewise, FIG. 11C shows a mechanical breakout with shutter plate 1203 lowered by motor 1206 into a position to block light from striking the cameras in camera array 1201.

Figure 12A:
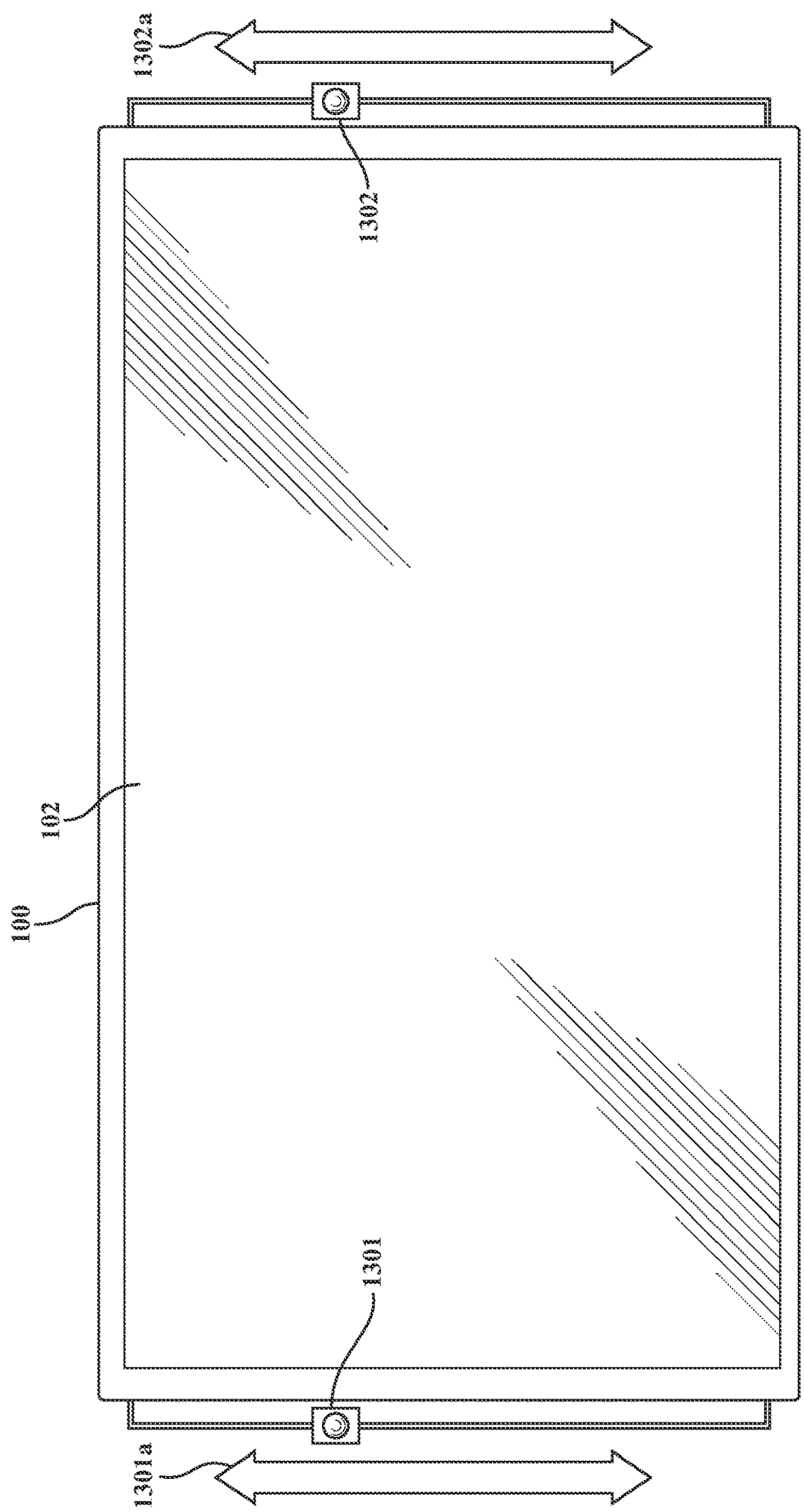
FIG. 12A shows an alternative embodiment of a host TV with a camera system comprising motor with motorized cameras 1301 and 1302 on vertical guides allowing the independent positioning of each camera.

FIG. 12A depicts an alternative embodiment useful for collecting three-dimensional images and locations of viewers in in front of the television 100. This alternative embodiment utilizes a motorized stereo camera system comprising left stereo camera 1301 and right stereo camera 1302 of the television display 102. For example only and no way as a limitation of the disclosure, these lens systems may be utilized by the processor 1400 of the television 100 with known stereoscopic techniques to locate viewers in front of the television system to, in one example, determine the distance to a viewer in order to zoom in on a person speaking in a video conference or, in another example, to determine scene lighting requirements to either convey to the user with an on-screen message or to trigger an automated process to increase lighting in front of the television display.

Figure 12B:
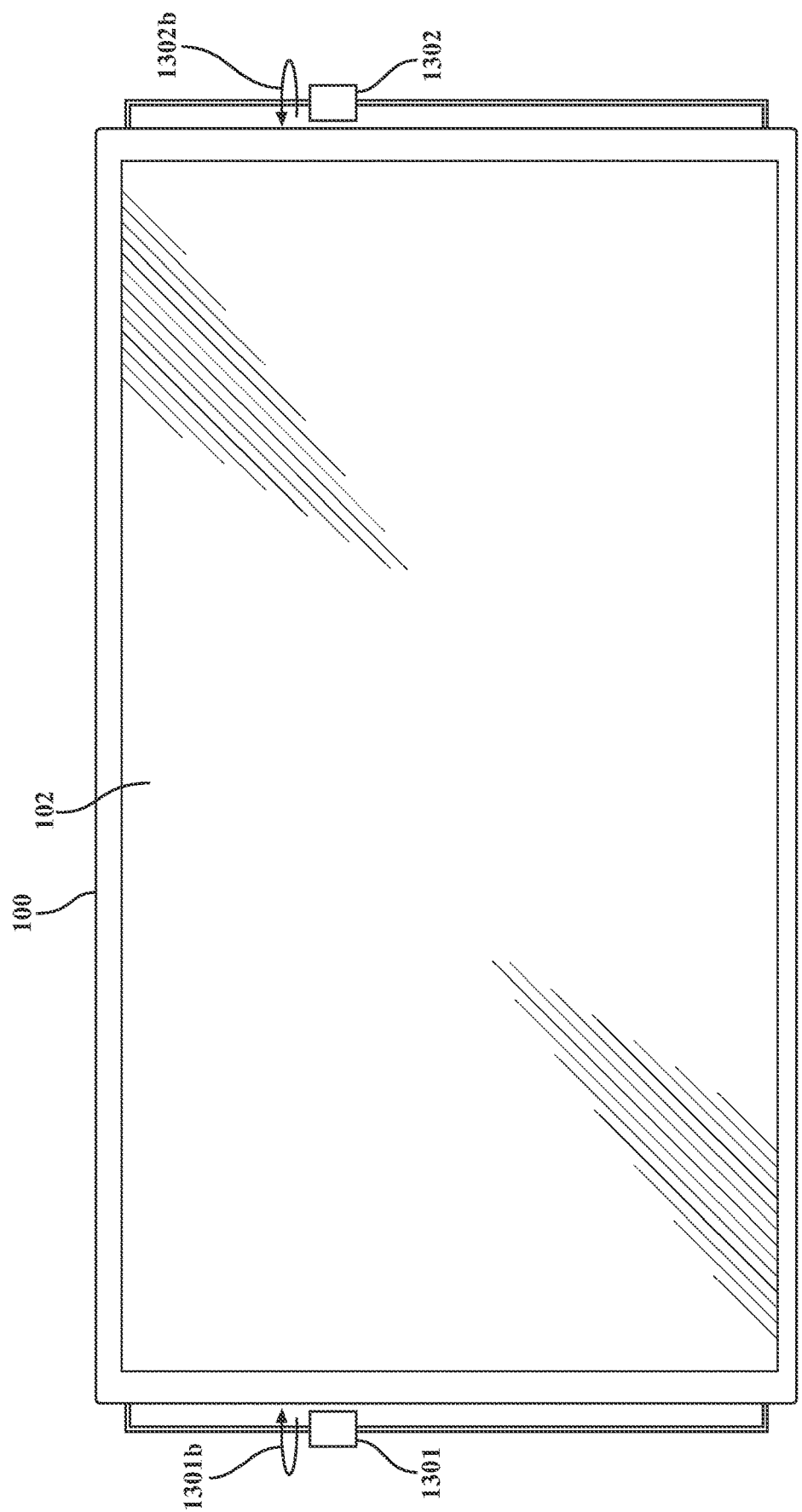
FIG. 12B shows an embodiment of FIG. 12A with the cameras rotated 180 degrees to disable the cameras' view of the room.
Figure 12C:
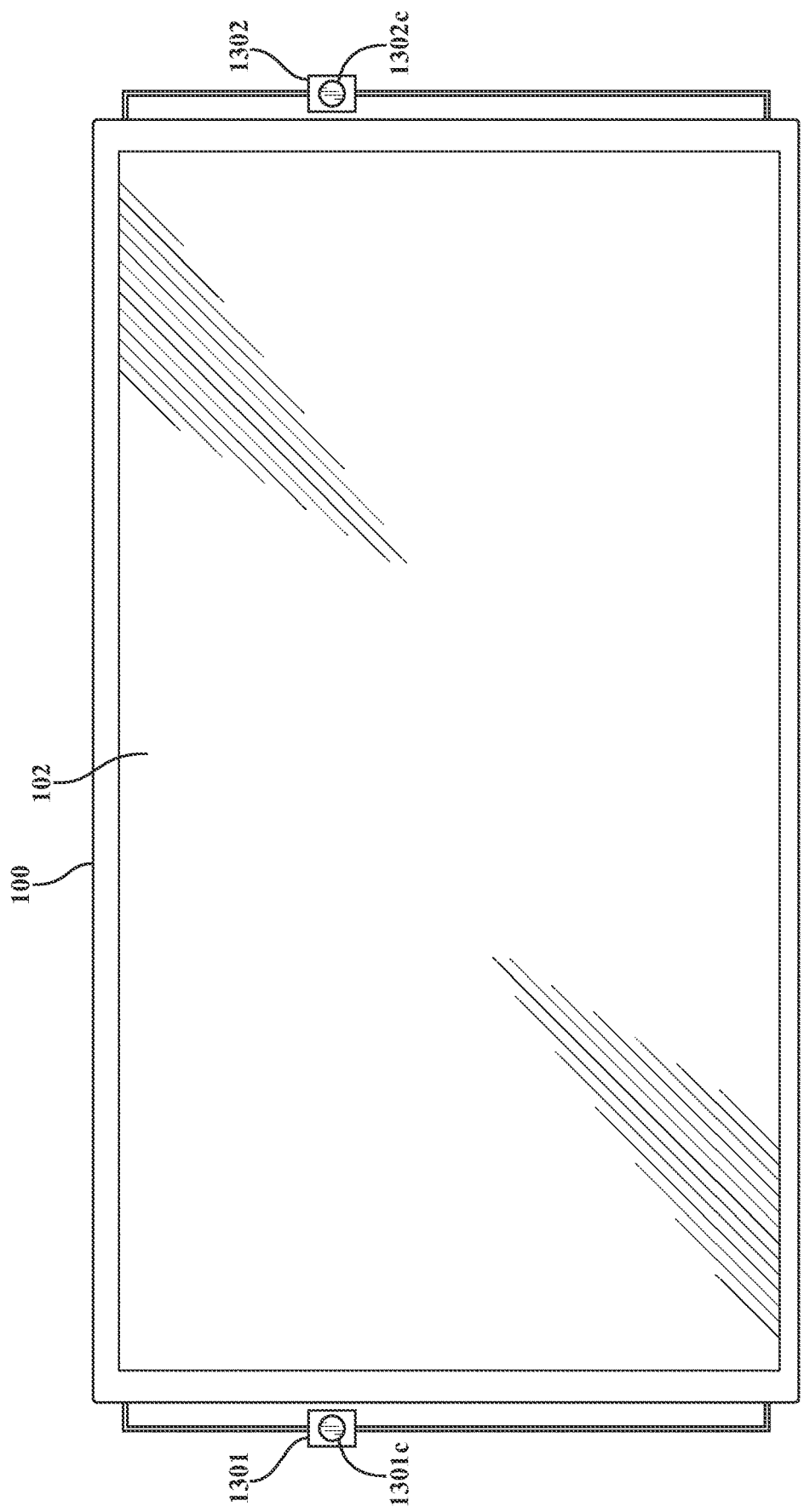
FIG. 12C illustrates an alternative embodiment of FIG. 12A with the cameras fitted with user-controllable shutters to disable the cameras' view of room.

To protect privacy, FIG. 12B shows another embodiment of the disclosure which provides a means to rotate the cameras 1301 and 1302 by 180 degrees so that when the camera are not in use, the user is assured of privacy from uninvited access from others, such as hackers, somewhere on the Internet.

Figure 13:
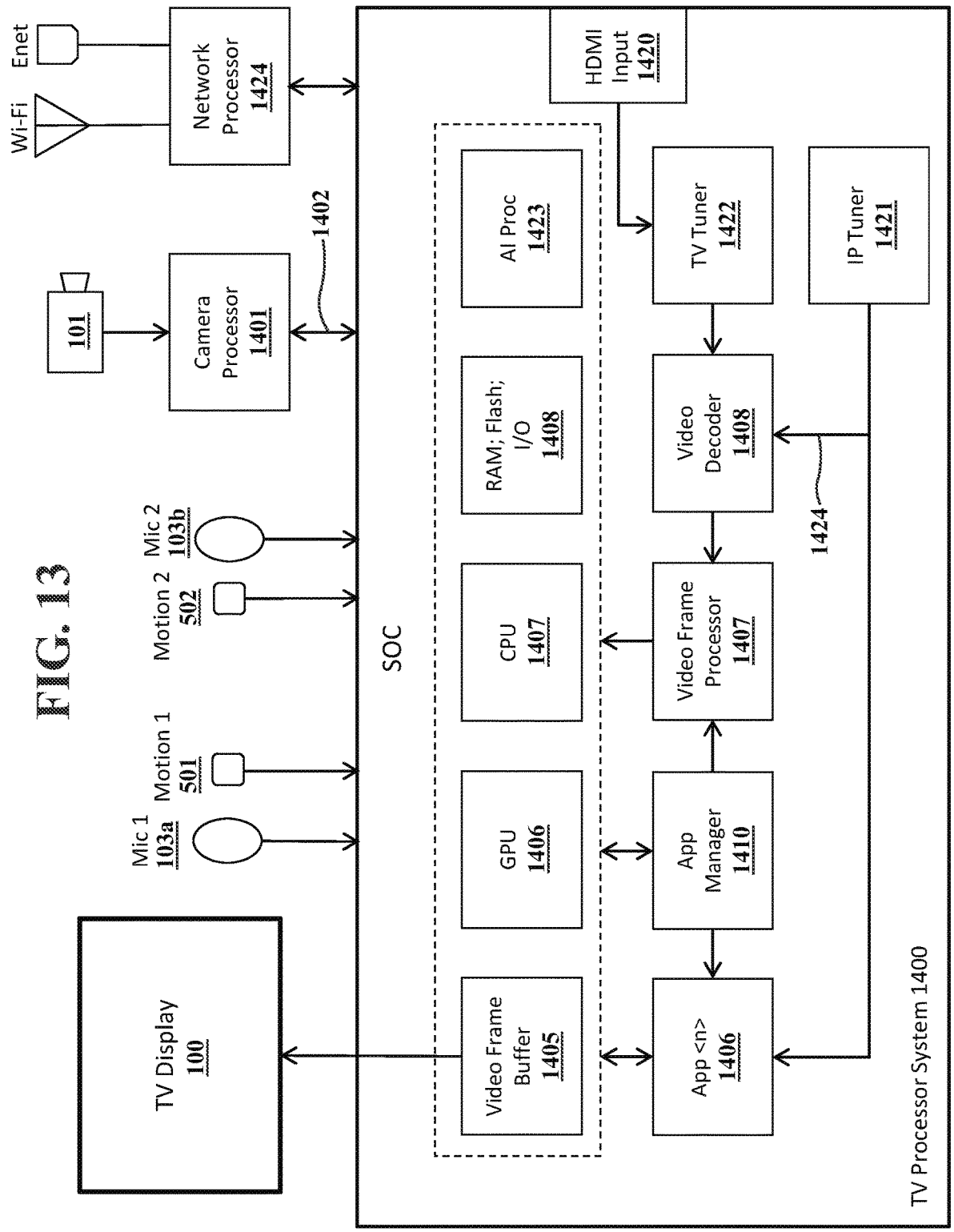
FIG. 13 is a block diagram of the processing system of the TV of FIG. 1, illustrating certain interface, control, and display system processes.

A processing system 1400 of TV 100—is shown in a block diagram in FIG. 13. Television signals are received either from a set-top box via HDMI 1420 or by a TV Tuner 1422 or Internet Protocol video is received by an IP Tuner 1421. Additional information regarding the environment directly in front of the TV 100 is collected by one or more video camera assemblies 101 integrated into or associated with the TV 100. In FIG. 13, the processing system 1400 provides the functions of image reception, image manipulation (scaling, stitching, transforms, etc.), and software application (app) execution. The embodiment depicted in FIG. 13 is representative of a smart TV processing system and is provided for example only and is not intended to restrict the disclosure to this schematic.

The one or more cameras comprising video camera assembly 101 in combination with the camera processor 1401 associated with the smart TV system provide digital picture information to the processing system 1400 of the TV 100. Processing system 1400 is typically implemented as a system-on-a-chip (SOC) 1403 consisting of a CPU 1407, a Graphical Processing Unit (GPU) 1406, RAM/permanent storage (flash) 1408, a video frame buffer 1405, and other necessary elements for use in a processor system of a smart TV. Camera information 1402 (video stream) of the disclosure may be processed by the video processor 1413 under the control of App Manager 1410 running in the memory of the SOC 1403 which processes the incoming camera video stream in order to act on the video information under the control of the application running in TV App 1406.

The TV App 1406 may also be executing a video calling or conferencing application or executing an entertainment application such as a video "watch party" or otherwise processing video both incoming from the other end or ends of a video conference call as well as providing the network streaming to send the processed video of the Camera Processor 1402 through the Internet to the other parties using a multi-way video application. The App Manager 1410 may assist TV App 1406 in processing the video broadcasts received by the TV Tuner 1422, the HDMI Input 1420 received from a set-top box, or video received over the Internet by IP Network Interface 1421.

In all examples, the App Manager 1410 does, among other things, the processing of the composite video output of TV App 1406 so that the composite video picture involving local and remote video sources and whatever other elements such as graphic overlays generated by TV App 1406 are scaled and positioned appropriate to the executing application or service.

Figure 14:
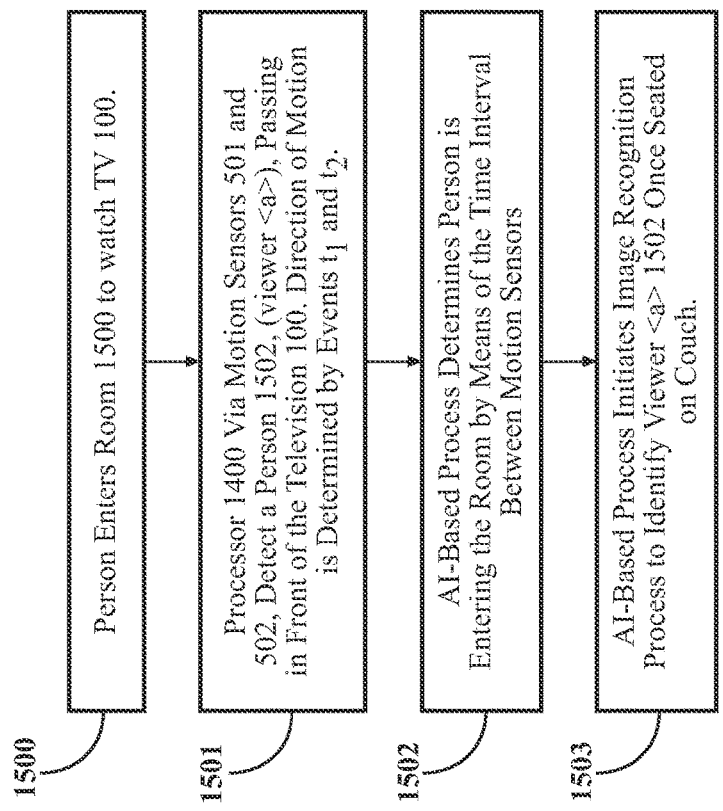
FIG. 14 is a flow diagram depicting a method of using motion sensors to detect the entry of a person into a room with the TV of FIG. 1.
Figure 15:
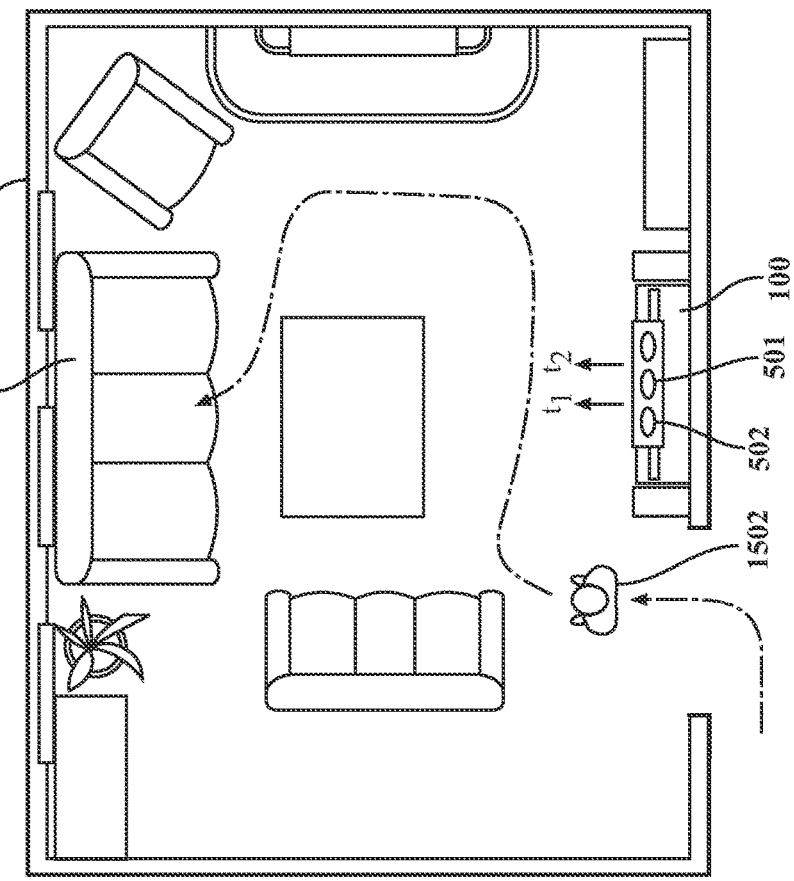
FIG. 15 is a depiction of a room with the TV of FIG. 1 used to illustrate the use of motion sensors to detect the entry of a person into the room.
Figure 16:
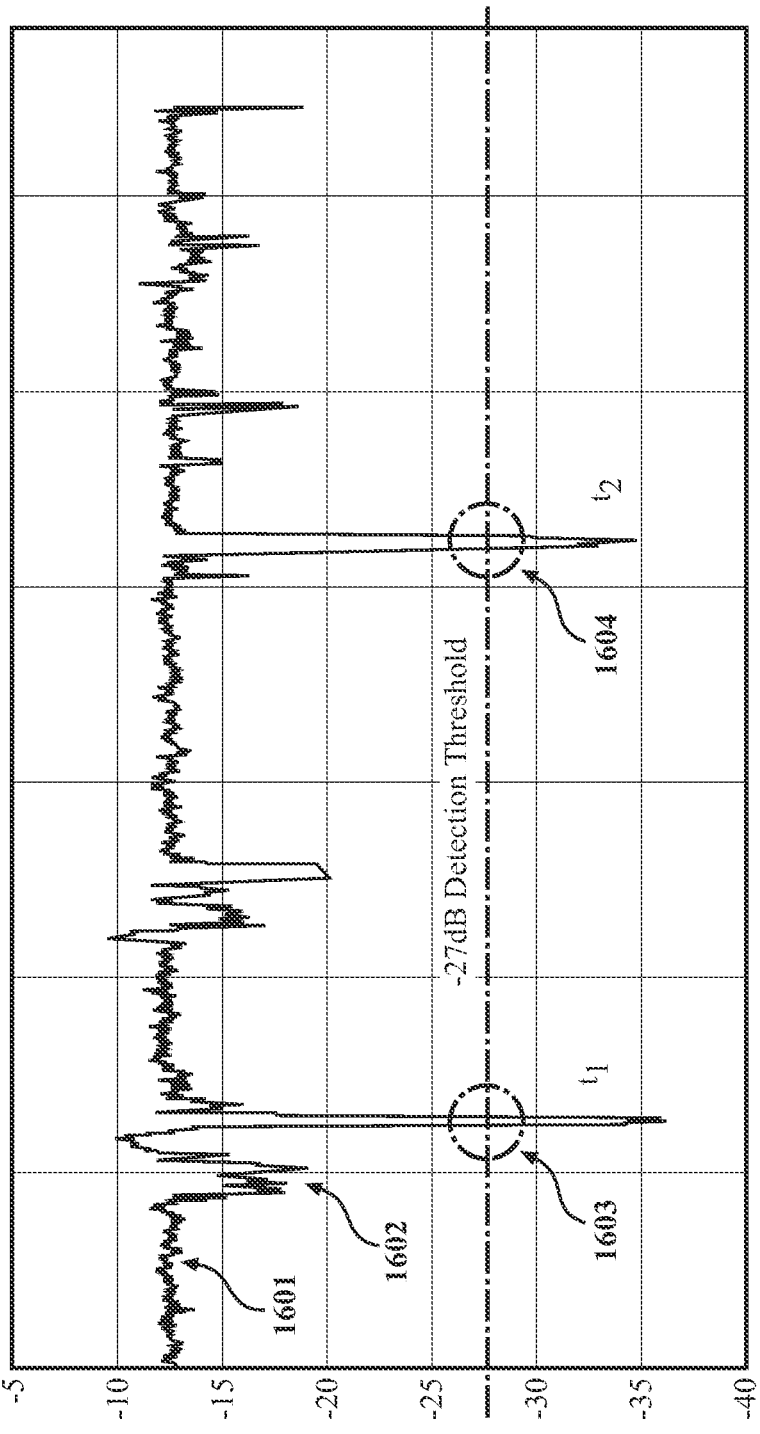
FIG. 16 is a depiction of signals from the motion detectors of FIG. 5 upon the entry of a viewer into the room of FIG. 15.

Referring to FIGS. 14 and 15, a method of using motion sensors 501 and 502 (FIG. 5) to detect the entry of a viewer into a room will now be described. Room 1497 includes a couch 1499 placed within view of television 100. A viewer enters room 1500 (step 1500) and first passes by motion sensor 502 at time $t_1$ and then passes motion sensor 502 at $t_2$. The use of dual, spaced motion sensors 501 and 502 allows for the determination of a direction of travel (e.g., entering the room 1497 or leaving it) of the viewer. The respective signals 1602 and 1604 generated by motion sensors 501 and 502 are shown in FIG. 16. Referring again to FIG. 15a, in step 1501 TV processor 1400 receives signals from motion sensors 501 and 502. In step 1502 processor 1400 executes an AI (artificial intelligence) based process to determine the time interval between signal changes 1603 and 1604 and determines that the person has entered room 1497. An AI-based process then initiates an image recognition process using camera assembly 101 to capture the image of the person and compares the captured image data to image data stored in a database in association with the names of people corresponding to the image data to determine the identity of viewer 1502. In certain examples, motor 901 is deployed if motion in room 1497—is detected after a specified period during which no motion was detected.

The foregoing mechanical systems for deploying and/or activating cameras associated with TV 100 enhance personal privacy and protect the cameras' lens assemblies. For the camera system built into the top of the television frame (FIGS. 6-9), a motor drive unit causes a camera system to deploy or stow under the control of an executing app running on the processor system of the smart TV or by the user commanding the camera via a remote control or mobile app or their voice commands. For camera element arrays, or "pin-hole" cameras, mounted in the frame of the television (FIGS. 11A-11C), a motor raises and lowers a shutter exposing all elements when raised or occluding all cameras when lowered. For stereo cameras mounted on rails on the sides of the television (FIGS. 12A-12B), a motorized means rotates the cameras to point to the rear of the TV when not in use.

The foregoing systems featuring multiple cameras, such as systems featuring arrays of cameras (FIGS. 11A-11B) and vertically-repositionable cameras positioned on either side of the TV frame (FIGS. 12A-12B) enhance video quality by providing different camera view angles that can be composited to yield an image of higher quality and more versatility than a single camera element could deliver. The presence of multiple image devices allows algorithmic processes to be applied on the computer system of the smart TV to enhance the video image in a multiplicity of advantageous processes. Images from the multiple cameras can be used to improve resolution, to zoom in on a subject to frame the speaker in a group of video-call participants or zoom out to capture the group without the need for expensive and mechanically large camera lenses. Using appropriate algorithms, the speaker's face can be transformed to appears to be looking into the camera even when he or she is not. Still other uses include using stereo camera pairs to measure the distance to a subject in front of the television for the purpose of determining required scene lighting levels for an optimal picture.

What is claimed is:

1. A video system, comprising:
    a video display having a front surface and a rear surface spaced apart along a depth axis, and an upper surface and a lower surface spaced apart along a height axis;
    a camera compartment located proximate the upper surface of the video display, the camera compartment having a recess;
    a dust cover that selectively covers the recess, the dust cover comprising a cam follower surface;
    a video camera in a camera housing, wherein the camera housing defines a cam surface and is selectively retractable into and deployable from the recess;
    a motor enclosed in the recess and operatively connected to the camera housing, wherein the motor is selectively energizable to traverse the camera housing along an arc path such that the camera housing cam surface engages the dust cover cam follower surface to displace the dust cover and allow the camera housing to exit the camera compartment.

2. The video system of claim 1, wherein the dust cover is biased into a closed position such that during a camera deployment operation, disengagement of the camera housing cam surface from the dust cover cam follower surface causes the dust cover to close when the camera housing is in a deployed configuration.

3. The video system of claim 1, wherein the camera housing is attached to a bracket that is operatively connected to a rotating motor shaft such that when the shaft rotates the camera housing is traversed along the arc path.

4. The video system of claim 1, wherein the camera housing has a camera housing center and is rotatable about the camera housing center to alter a viewing angle of the video camera when the video camera is at a fixed position along the arc.

5. The video system of claim 1, wherein when the camera housing is in a deployed configuration, the camera housing is spaced apart from the video display upper surface along the height axis.

6. The video system of claim 5, wherein when the camera housing is in a deployed configuration, the camera housing is spaced apart from the video display along the depth axis.

7. The video system of claim 6, wherein during a deployment operation, the camera housing starts at a reset point and sequentially reaches three turning points.

8. The system of claim 1, further comprising a motion sensor connected to the video display and operatively connected to the motor such that when motion is detected after a period in which no motion is detected for a selected period of time, the motor is energized and deploys the camera housing from the camera compartment.

9. A video system, comprising:
    a video display having an upper surface and a lower surface defining a height axis, and a front surface and a rear surface defining a depth axis;
    a video camera contained in a camera housing;
    a camera compartment proximate the upper surface of the video display, the camera compartment comprising a recess selectively covered by a dust cover; and
    a motion sensor connected to the video display and operatively connected to the motor such that when motion is detected after a period in which no motion is detected for a selected period of time, the motor is energized and deploys the camera housing from the camera compartment;
    wherein the camera housing has a stowed configuration in which the camera housing is located in the recess and a deployed configuration in which the camera housing is located outside the recess, and the camera housing has a camera housing center and is rotatable about the camera housing center to alter a viewing angle of the camera when the camera is in the deployed configuration.

10. The video system of claim 9, wherein during a deployment operation, the camera housing traverses an arc in a plane that is perpendicular to the video display front surface.

11. The video system of claim 9, further comprising:
    a motor having a rotating shaft;
    a bracket connected to the camera housing and to the rotating shaft, such that rotation of the shaft causes the deployment of the camera housing from the camera compartment.

12. The video system of claim 9, wherein the dust cover is biased closed.

13. The video system of claim 9, wherein when the video camera housing is in the deployed configuration, the camera housing is spaced apart from the video display upper surface along the height axis.

14. The video system of claim 13, wherein when the camera housing is in the deployed configuration, the camera housing is spaced apart from the video display front surface along the depth axis.

15. The video system of claim 14, wherein during a deployment operation, the camera housing starts at a reset point and sequentially reaches three turning points.

* * * * *